(12) United States Patent
Sudhakar et al.

(10) Patent No.: US 11,093,483 B2
(45) Date of Patent: Aug. 17, 2021

(54) MULTILEVEL DATA LINEAGE VIEW

(71) Applicant: Microsoft Technology Licensing, LLC, Redmond, WA (US)

(72) Inventors: Anubhav Siddharth Sudhakar, Bellevue, WA (US); Saikat Guha, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 16/362,240

(22) Filed: Mar. 22, 2019

(65) Prior Publication Data

US 2020/0301910 A1    Sep. 24, 2020

(51) Int. Cl.
  *G06F 7/00*     (2006.01)
  *G06F 16/23*    (2019.01)
  *G06N 20/00*    (2019.01)

(52) U.S. Cl.
  CPC ......... *G06F 16/2379* (2019.01); *G06N 20/00* (2019.01)

(58) Field of Classification Search
  CPC ............................ G06F 16/2379; G06N 20/00
  USPC ........................................ 707/600–899, 758
  See application file for complete search history.

(56) References Cited

U.S. PATENT DOCUMENTS

| | | | |
|---|---|---|---|
| 4,479,196 A | 10/1984 | Ferrer et al. | |
| 5,193,185 A | 3/1993 | Lanter | |
| 8,161,048 B2 | 4/2012 | Procopiuc et al. | |
| 2005/0102256 A1* | 5/2005 | Bordawekar | G06F 16/83 |
| 2010/0070463 A1 | 3/2010 | Zhao et al. | |
| 2010/0114629 A1 | 5/2010 | Adler et al. | |
| 2014/0114905 A1 | 4/2014 | Kozina et al. | |
| 2017/0017708 A1 | 1/2017 | Fuchs et al. | |
| 2017/0039253 A1 | 2/2017 | Bond | |
| 2017/0091345 A1 | 3/2017 | Brainerd et al. | |

OTHER PUBLICATIONS

"International Search Report and Written Opinion issued in PCT Application No. PCT/US20/022515", dated May 29, 2020, 13 Pages.

Chen, et al., "Visualization of Network Data Provenance", In Proceedings of 19th International Conference on High Performance Computing, Dec. 18, 2012, 9 Pages.

Rio, et al., "Probe-It! Visualization Support for Provenance", In Proceedings of International Symposium on Visual Computing, Nov. 26, 2007, 10 Pages.

\* cited by examiner

*Primary Examiner* — Isaac M Woo

(74) *Attorney, Agent, or Firm* — Holzer Patel Drennan

(57) ABSTRACT

A multilevel data lineage view system disclosed herein allows generating higher level data lineage views. An implementation of the multilevel data lineage view system is implemented using various computer process instructions including receiving information about a plurality of objects, wherein at least some of the objects are organized in a hierarchy, determining relations between at least some of these objects at a first level in the hierarchy, and inferring relationships between the objects at a second level in the hierarchy based on the relationships between the objects at the first level in the hierarchy based on a count of assets of constituent parts of the objects at the first level in the hierarchy, wherein the second level is above the first level in the hierarchy.

19 Claims, 5 Drawing Sheets

MULTILEVEL DATA LINEAGE VIEW

BACKGROUND

Data lineage may be defined as the journey data takes as it moves from its originating data source to the ultimate destination. Various data stores may use data maps that catalog internal data and data flow lineage information about streams at their lowest level such as, for example, stream A is used in a job to produce stream B. Such data flow lineage information may be represented by an edge from stream A (input node) to stream B (output node). While viewing such data flow lineage information at this lower most level is certainly useful, a wider, more-encompassing solution is necessary.

SUMMARY

Implementations described herein discloses a multilevel data lineage view system. An implementation of the multilevel data lineage view system is implemented using various computer process instructions including receiving information about a plurality of objects, wherein at least some of the objects are organized in a hierarchy, determining relations between at least some of these objects at a first level in the hierarchy, and inferring relationships between the objects at a second level in the hierarchy based on the relationships between the objects at the first level in the hierarchy based on a count of assets of constituent parts of the objects at the first level in the hierarchy, wherein the second level is above the first level in the hierarchy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

A multilevel data lineage view system disclosed herein allows generating higher level data lineage views. An implementation of the multilevel data lineage view system is implemented using various computer process instructions including receiving information about a plurality of objects, wherein at least some of the objects are organized in a hierarchy, determining relations between at least some of these objects at a first level in the hierarchy, and inferring relationships between the objects at a second level in the hierarchy based on the relationships between the objects at the first level in the hierarchy based on a count of assets of constituent parts of the objects at the first level in the hierarchy, wherein the second level is above the first level in the hierarchy The technology disclosed herein solves a technical problem of determining relationships between higher levels of data sources. Specifically, the technology disclosed herein allows a user to solve the technological problem of determining which clusters, virtual clusters, folders, and other data source constituent parts of an input data source are related to which clusters, virtual clusters, folders, and other data source constituent parts of an output data source. By allowing a user to determine such information, the technology disclosed herein allows a user to implement data integrity and privacy related conditions on constituent parts of a target data source based on such conditions on constituent parts of an input data source.

Figure 1:
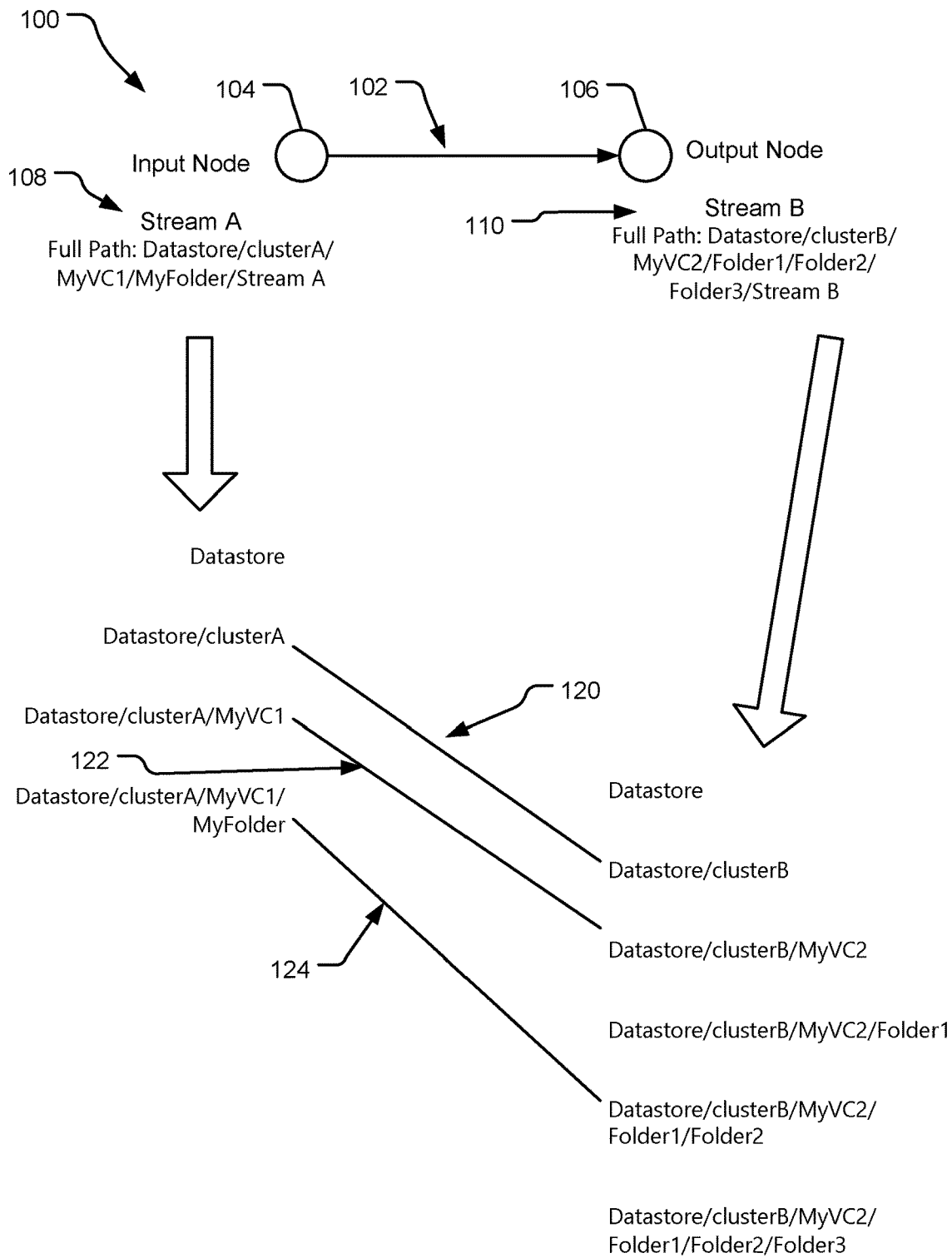
FIG. 1 illustrates an example of multilevel data lineage view between two datastores as disclosed herein.

FIG. 1 illustrates an example of multilevel data lineage view 100 between two datastores as disclosed herein. Specifically, a relation between an input node 104 and an output node 106 is represented by an edge 102. For example, the input node 102 and the output node 104 may be files. The edge 102 illustrates that the output node 106 uses the file represented by the input node 104 as an input. While in the illustrated view 100, only one to one edge is disclosed, the output node 106 may use a plurality of input nodes as input. Similarly, the input node 104 may be used to generate a plurality of output nodes.

In the illustrated implementation, the input node 104 is represented by a stream A 108 and the output node 106 is represented by a stream B 110. Specifically, stream A 108 provides a path of the file that is represented by input node 104 and stream B 110 provides a path of the file that is represented by output node 106. However, the edge 102 represents a single lowest level edge between the input node 104 and the output node 106. While viewing the lineage information at this lower most level is certainly useful, it is also important to find out lineage information at higher data levels. For example, it is useful to know which clusters at cluster level interact with each other or how different data stores are linked to each other and how they interact with each other. Similarly, owners of virtual clusters in each data stores may be interested in knowing if there is any dependency to other virtual clusters in other data stores. Specifically, with the introduction of the general data protection requirements (GDPR), if data in some virtual cluster or dataset is marked as personal data, the owner of such data would be interested in ensuring that other datasets/clusters that consume such personal data are marked as containing personal data so that delete processors, for example, can function correctly.

The multilevel data lineage view system provides higher level edges such as a cluster level edge 120, a virtual cluster level edge 122, and a folder level edge 124. In one implementation, such higher-level edges are determined based on the count of assets at each level. For example, for the edge 102, the multilevel data lineage view system parses the full path of the input node 104 and the output node 106 into its constituent parts. Thus, the path "Datastore/clusterA/MyVC1/MyFolder/Stream A" for the input node 104 may be reduced to its constituent parts as follows:

"datastore"

"datastore/clusterA"

"datastore/clusterA/myVC1"

"datastore/clusterA/myVC1/MyFolder"
"datastore/clusterA/myVC1/MyFolder/streamA.xxx"

Similarly, the path "Datastore/clusterB/MyVC2/Folder1/Folder2/Folder3/Stream B" for the output node 106 may be reduced to its constituent parts as follows:

"datastore"
"datastore/clusterB"
"datastore/clusterB/myVC2"
"datastore/clusterB/myVC2/Folder1"
"datastore/clusterB/myVC2/Folder1/Folder2"
"datastore/clusterB/myVC2/Folder1/Folder2/Folder3"
"datastore/clusterB/myVC2/Folder1/Folder2/Folder3/stream.yyy"

Subsequently, the multilevel data lineage view system calculates the number of assets at each of the constituent levels. For example, for Stream A, the multilevel data lineage view system may determine that there are 20 top level datastores, eight clusters in the datastore, 1600 virtual clusters, 30000 objects one level below the virtual cluster, 65000 objects two levels below the virtual clusters, 250 k objects three levels below the virtual cluster on datastore, where objects may be folders or files.

Subsequently, the multilevel data lineage view system adds higher level edges between constituent parts of the input node 104 with constituent parts of the output node 106 based on number of assets at various constituent parts. For example, the number of assets may be the number of files in a folder, number of tables in a folder, number of folders in virtual cluster, etc. In one implementation, the edges are added when the number of assets for a given constituent part of input node 104 is approximately similar to the number of assets for a given constituent part of output node 106.

For example, if the number of files at "datastore/clusterA/myVC1/MyFolder" constituent part of input node 104 is 1,000 and the number of files at constituent part ""datastore/clusterB/myVC2/Folder1/Folder2" is 1,150, a higher level edge 124 is created between these two constituent parts. Here the number of assets for the constituent part ""datastore/clusterB/myVC2/Folder1/Folder2" may be total of all files in all the subfolders under "folder2," including the files in the subfolder "folder 3." In one implementation, the number of assets 1,000 at "datastore/clusterA/myVC1/MyFolder" is compared to the number of assets at each of the various constituent parts of the output node 106. In such as case, if the number of assets for the constituent part "datastore/clusterB/myVC2/Folder1/Folder2" is 1,150 and the number of assets for the constituent part "datastore/clusterB/myVC2/Folder1/Folder2/Folder3" 700, then the higher level edge is created between the " . . . MyFolder" and " . . . Folder2."

Alternatively, if the number of assets for the constituent part "datastore/clusterB/myVC2/Folder1/Folder2" is 1,350 and the number of assets for the constituent part "datastore/clusterB/myVC2/Folder1/Folder2/Folder3" 900, then the higher level edge is created between the " . . . MyFolder" and " . . . Folder3." Thus, the multilevel data lineage view system creates higher level edge from a constituent part of the input node 104 to a constituent part of the output node 106 that is closest in terms of the number of assets of the constituent part of the input node 104. Similarly, if the number of files under the constituent part " . . . myVC1" is 25,00, the number of files under the constituent part " . . . cluster" is 50,000, the number of files under the constituent part " . . . myVC2" is 20,000, and the number of files under the constituent part " . . . Folder1" is 10,000, the multilevel data lineage view system creates the higher level edge 122 between the constituent parts " . . . myVC1" and " . . . myVC2."

Figure 2:
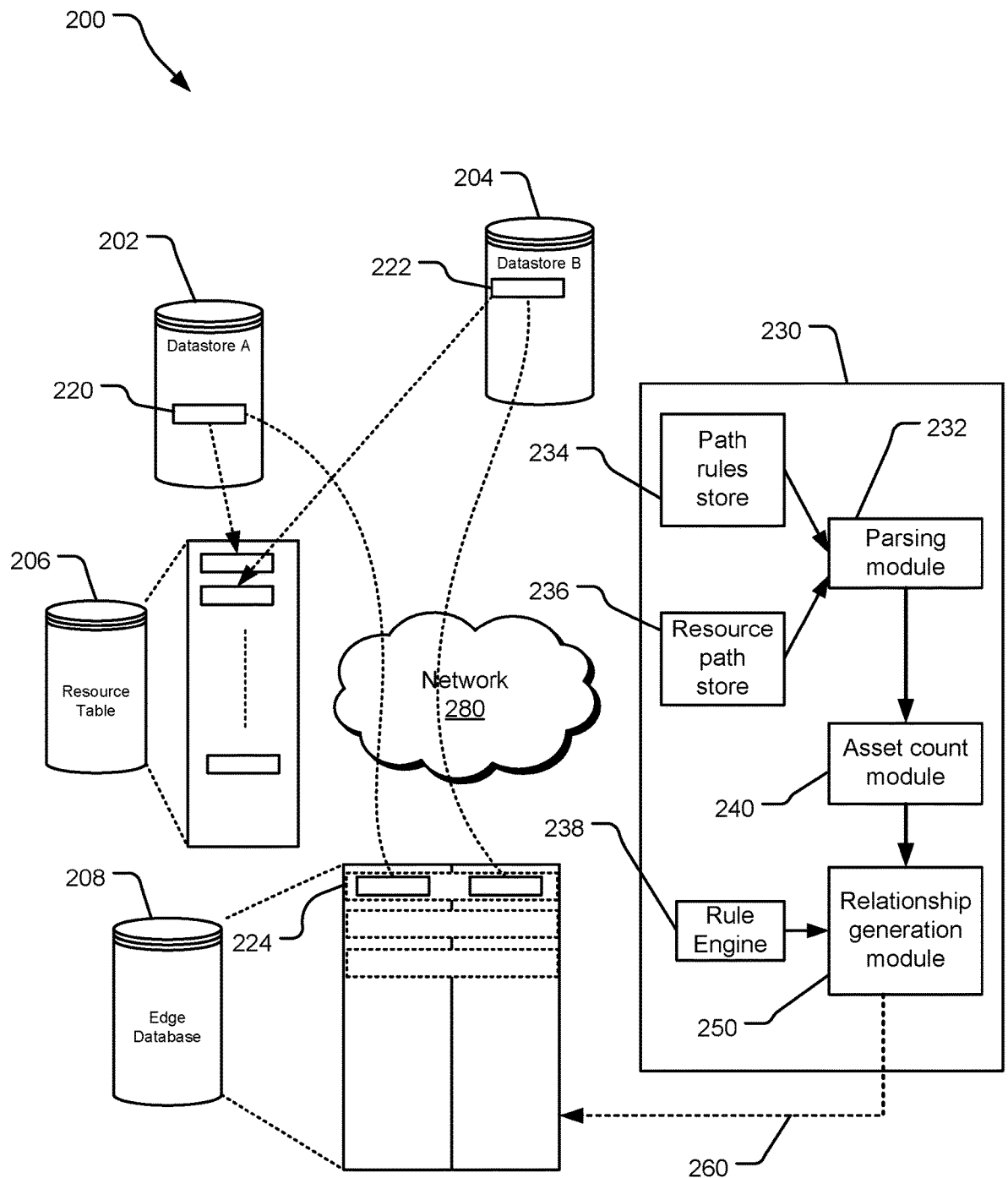
FIG. 2 illustrates another example implementation of a multilevel data lineage view system as disclosed herein.

FIG. 2 illustrates another example implementation of a multilevel data lineage view system 200 as disclosed herein. Specifically, the multilevel data lineage view system 200 works with a number of datastores including a datastore A 202 and a datastore B 204. Note that in alternative implementation, the multilevel data lineage view system 200 may work with a large number datastores. The datastores 202, 204 may be a relational datastore, a graph datastore, a flat datastore, etc. One or more of these datastores 202, 204 may be implemented on a server or in a cloud environment may communicate with other servers using a network 280, such as the Internet.

Each of the datastores 202, 204 may store a plurality of resources, such as files, tables, etc. For example, the datastore 202 include a resource 220 that is a file and the datastore 204 includes another resource 222 that is also a file. The resources 220, 222 may be used as source file for generating other resources. For example, the resource 202 may be used by an application to generate the resource 204. In such a case, the resource 202 may be identified as the input resource and the resource 222 may be identified as the output resource.

The multilevel data lineage view system 200 also includes a resource table 206 that stores the listing of the one or more of the various resources in various datastores. Thus, for example, the resource table 206 may include listing of the resource 220 and the resource 222. The multilevel data lineage view system 200 also includes an edge database 208 that stores information about various edges between the various resources. For example, the edge database 208 may include an edge 224 identifying an edge between the resource 220 and the resource 222, where the resource 220 is an input resource and the resource 222 is an output resource. Specifically, the edge 224 is a lowest level edge that identifies the relations between the resources 220 and 222. Each of the resource table 206 and the edge database 208 may be updated at predetermined time intervals, such as for example, every few hours.

A multilevel data lineage view engine 230 generates higher level edges between various resources based on one or more lower level edges, such as the edge 224. The multilevel data lineage view engine 230 may be implemented on a server using a computing device such as the computing device disclosed in FIG. 5 below. The multilevel data lineage view engine 230 may include a parsing module 232 that parses the resource paths of various resources linked by the data lineage edges, such as the edge 224. In one implementation, a resource path store 236 may store such paths for various resources. The resource path store 236 may receive such paths from the resource table 206. The parsing module 232 also receives one or more path rules from a path rules store 234.

Specifically, the path rule store 234 defines various path rules about how one or more paths in the paths store 236. For example, one path rule may be that the various constituent parts of a stream are separated from each other by a backslash ("/"). Another path rule may be that the various constituent parts of a stream are separated from each other by a dot ("."). The parsing module 232 uses the path rules and the resource paths to generate constituent parts for the input and output resources of edges. For example, if an input resource is "Datastore/clusterA/MyVC1/MyFolder/StreamA.xxx," the parsing module may parse it into its constituent parts as follows:

"datastore"
"datastore/clusterA"
"datastore/clusterA/myVC1"
"datastore/clusterA/myVC1/MyFolder"
"datastore/clusterA/myVC1/MyFolder/streamA.xxx"

An asset count module 240 counts the number of assets for each constituent part of the input and the output resource for the various edges. For example, if a constituent part of an input resource is "datastore/clusterB/myVC2/Folder1/Folder2" the asset count module 240 counts the number of files in Folder2 as the asset count for the constituent part " . . . /Folder2," the number of files in all folders under Folder1 as the asset count for the constituent part " . . . /Folder1," etc.

A relationship generation module 250 receives the list of constituent parts for input resource and the output resource of a lower level edge and generates higher level edges between constituent parts of such input resource and the output resource. Specifically, the relationship generation module 250 generates such higher-level edges based on the assigned asset counts for the various constituent parts. A rule engine 238 may provide rules for matching constituent parts of an input node with constituent parts of an output node of an edge based on the number of assets at each of these constituent parts. For example, the rule engine 238 may specify creating higher level edges between a constituent parts of an input node and a constituent parts of an output node based on substantial similarity of the asset count of these constituent parts.

Thus, a higher level edge may be created from a constituent parts of an input node to a constituent parts of an output node where the asset counts of these two constituent parts are closest to each other compared to asset counts of the other constituent parts. Furthermore, in one or more implementations, such rules provided by the rule engine 238 may be programmable rules including rules based on regular expressions such as one that could provide the correct constituent parts of input and output nodes between which a higher-level edges are created. An example of the application of such rule is further discussed above with respect to FIG. 1. The newly created higher-level edges may be added back to the edge database 208 as illustrated by 260.

Figure 3:
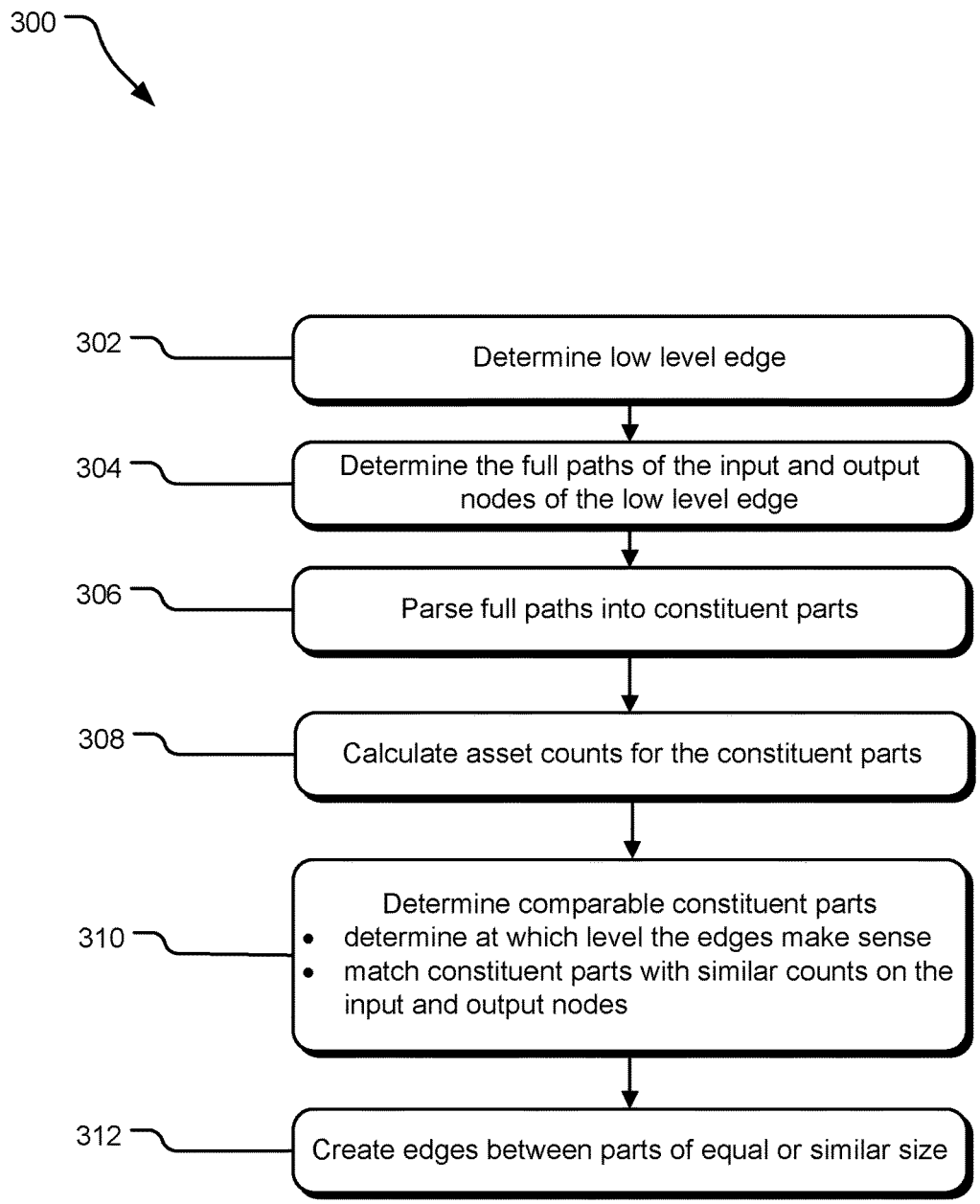
FIG. 3 illustrates example operations for providing multilevel data lineage view for a datastore.

FIG. 3 illustrates example operations 300 for providing multilevel data lineage view for a datastore. An operation 302 determines lower level edges between an input node and an output node. For example, the input node may be a file that is used in generating a file that represents the output node. In one implementation, such lower level edge may be stored in an edge database. Subsequently, an operation 304 determines full paths of the input node and the output node of the lower level edge. For example, if the input node is a file within a datastore, the operation 304 determines the full path to that file from the datastore level including all the intervening clusters, virtual clusters, folders, etc. An operation 306 parses the full paths to the nodes into its constituent parts. For example, a constituent part of an input node may be cluster that stores the folder that stores the file representing the input node, a folder that stores a subfolder storing the file representing the input node, etc.

An operation 308 determines the asset count for various constituent parts of the input and the output nodes. For example, an asset count for a constituent part may be the total number of files at that constituent part level. Thus, if a constituent part is "datastore/clusterB/myVC2/Folder1/Folder2," the operation 308 counts the number of files in Folder2 as the asset count for the constituent part " . . . /Folder2." An operation 310 determines comparable constituent parts of the input node and the output node based on the asset counts. For example, the operation 310 may determine such comparable constituent parts based on substantial similarity between the asset count of a constituent part of the input node and the asset count of a constituent part of the output node. Subsequently, an operation 312 creates a higher-level edge between such comparable constituent parts of the input node and the output node.

Figure 4:
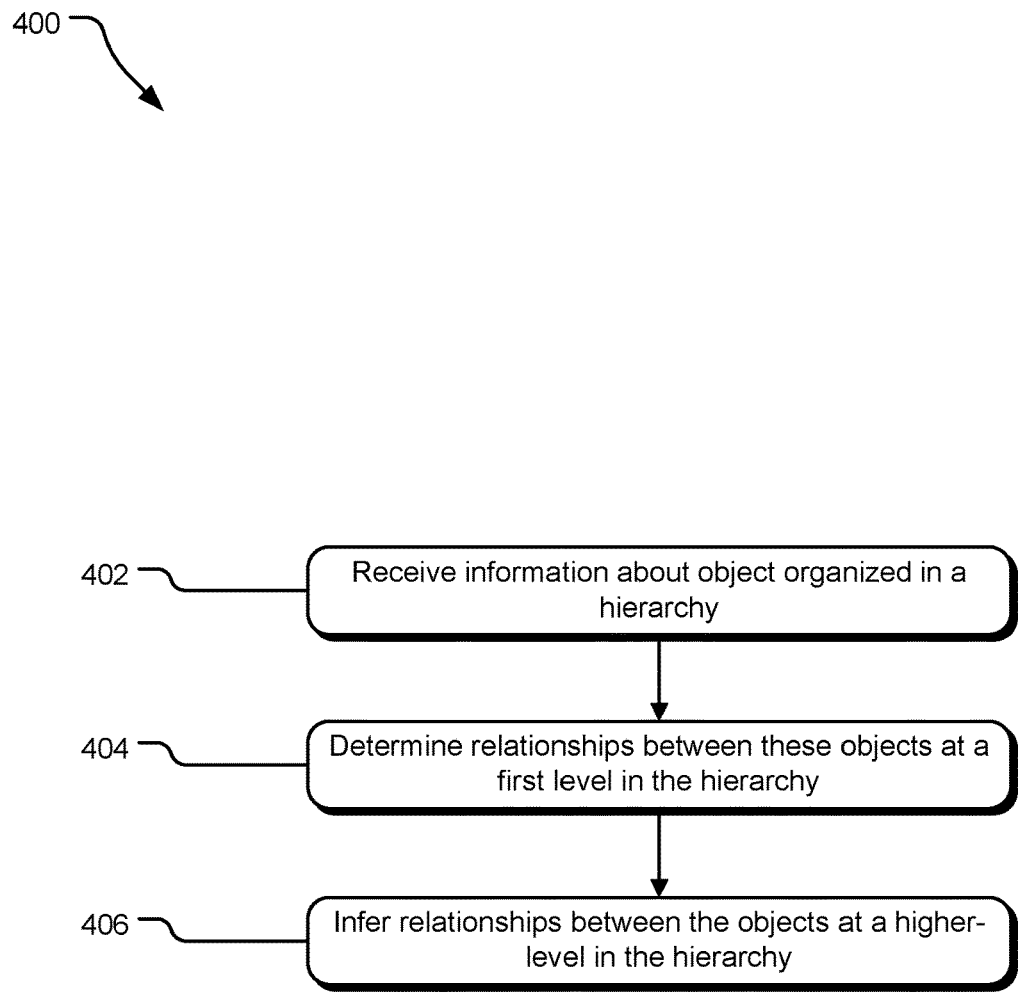
FIG. 4 illustrates alternative example operations for providing multilevel data lineage view for a datastore according to implementations disclosed herein.

FIG. 4 illustrates alternative example operations 400 for providing multilevel data lineage view for a datastore according to implementations disclosed herein. An operation 402 receives information about an object organized in a hierarchy. For example, the operation 402 may receive information about a number of files being organized in a hierarchy. Specifically, there may be one or more input files that are organized in a first hierarchy and one or more output files that are organized in a second hierarchy with a relation between the input files and the output files recognized by edges. An operation 404 determines relationships between these objects at a first level in the hierarchy. For example, the operation 404 may recognize a low-level edge between an input file and an output file. Subsequently, an operation 406 infers relationships between the objects at a higher level in the hierarchy. For example, the operation 406 infers relations between the input files and the output files at higher levels of hierarchy. In one implementation, the higher levels of hierarchy may be inferred based on constituent parts of a path identifying the input files and the output files and the count of the number of assets related to one or more of such constituent parts.

In an alternative implementation, the higher levels of hierarchy may be inferred based on constituent parts of a path identifying the input files and the output files and the size of the number of assets related to one or more of such constituent parts. Yet alternatively, the higher levels of hierarchy may be inferred based on a user feedback received on a quality of the inferred relationships between the objects at the higher level. Furthermore, inferred relations between the objects at the higher level may also be generated by a machine learning model that is able to absorb user feedback for existing higher-level edges and provide other contextually similar higher-level edges as suggestions for inclusion.

Figure 5:
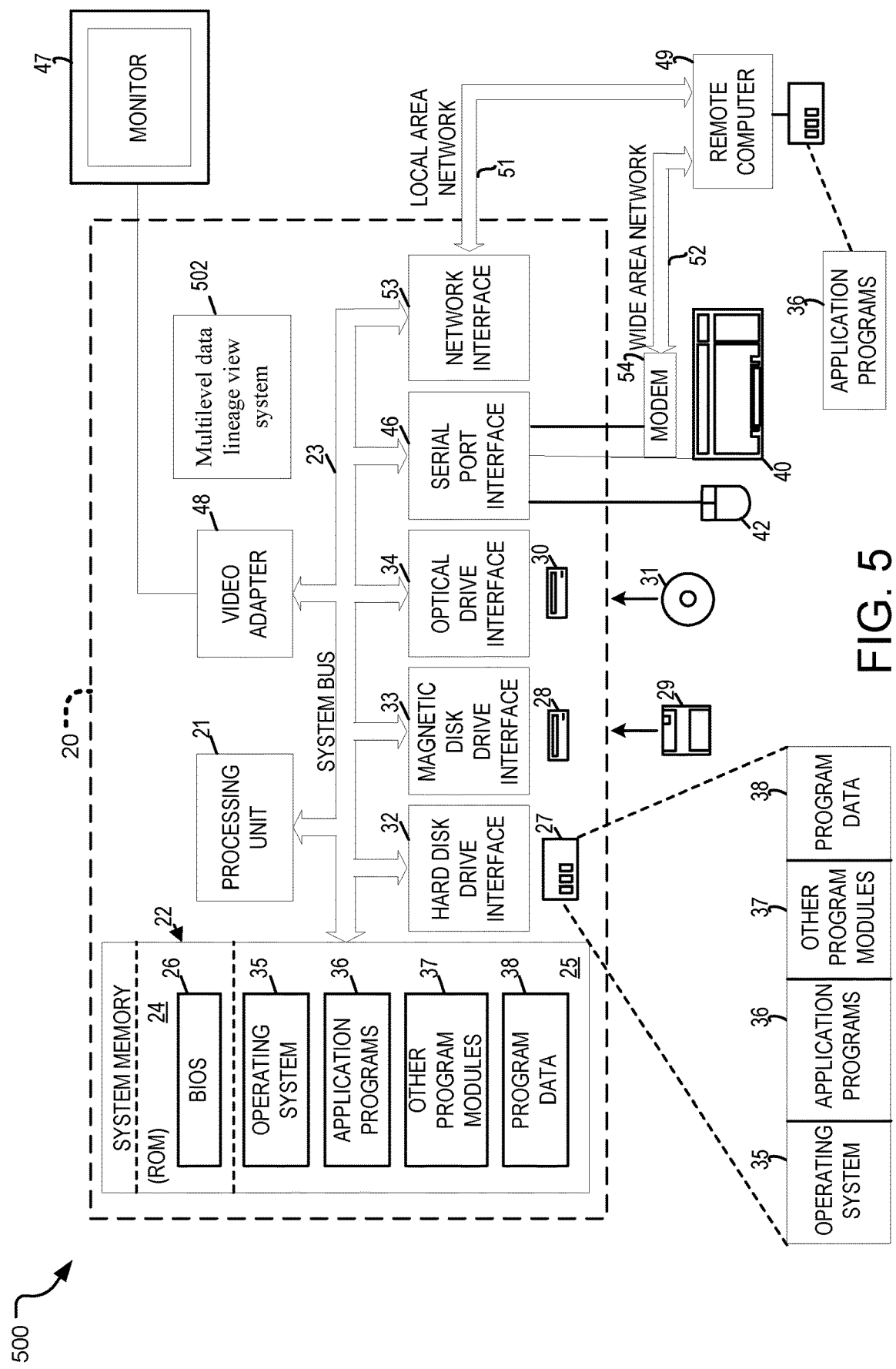
FIG. 5 illustrates an example computing system that may be useful in implementing the described technology.

FIG. 5 illustrates an example system 500 that may be useful in implementing the described technology for providing attestable and destructible device identity. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM)

24 and random-access memory (RAM) 25. A basic input/ output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more datastores disclosed herein may be stored in memory 22 and/or storage devices 29 or 31 as persistent datastores. For example, a multilevel data lineage viewing system 502 may be implemented on the computer 20 (alternatively, the multilevel data lineage viewing system 502 may be implemented on a server or in a cloud environment). The multilevel data lineage viewing system 502 may utilize one of more of the processing unit 21, the memory 22, the system bus 23, and other components of the personal computer 20.

An implementation disclosed herein provides a physical article of manufacture including one or more tangible computer-readable storage media, encoding computer-executable instructions for executing on a computer system a computer process to provide attestable and destructible device identity, the computer process comprising receiving information about a plurality of objects, wherein at least some of the objects are organized in a hierarchy, determining relations between at least some of these objects at a first level in the hierarchy, and inferring relationships between the objects at a second level in the hierarchy based on the relationships between the objects at the first level in the hierarchy, wherein the second level is above the first level in the hierarchy.

In one implementation, inferring relationships between the objects at a second level in the hierarchy comprising inferring relationships based on a count of assets below the second level in the hierarchy or total size of assets below the second level in the hierarchy. IN an alternative implementation, inferring relationships between the objects at a second level in the hierarchy comprising inferring relationships based on one or more programmable rules including rules based on regular expressions. In another implementation, inferring relationships between the objects at a second level in the hierarchy comprising inferring relationships based on a machine learning model including a machine learning model based on textual similarity, which is updated based on a user feedback received on a quality of the inferred relationships between the objects at the second level.

Alternatively, determining relations between at least some of these objects at a first level in the hierarchy includes receiving a lower level edge including a source and a destination stream and parsing the lower level edge to determine constituent parts of the lower level edge. Yet alternatively, determining relations between at least some of these objects at a first level in the hierarchy further includes assigning a count of assets to each of the constituent parts of the lower level edge and determining a higher-level edge between the constituent parts of the lower level edge based on the count of assets to each of the constituent parts of the lower level edge. In another implementation, each of the objects is represented by a stream comprising a number of constituent parts providing a path to the object. Alternatively, the relationships between the objects at the first level in the hierarchy is between streams of different constituent parts. Alternatively, the relations between at least some of these objects at the first level in the hierarchy are stored in an edge database.

In a computing environment, a method disclosed herein is performed at least in part on at least one processor, the method including receiving a lower level edge including a source and a destination stream, parsing the lower level edge to determine constituent parts of the lower level edge, assigning a count of assets to each of the constituent parts of the lower level edge, and determining a higher-level edge between the constituent parts of the lower level edge based on the count of assets to each of the constituent parts of the lower level edge. In one implementation, parsing the lower level edge to determine constituent parts of the lower level edge further comprising parsing the lower level edge using a rule engine. In another implementation, assigning a count of assets to each of the constituent parts further comprising assigning a count of assets based on a number of files below each of the constituent parts.

Alternatively, determining the higher-level edge between the constituent parts further comprising determining the higher-level edge based on one or more programmable rules. Yet altnernatively, determining the higher level edge between the constituent parts further comprising determining the higher level edge between a constituent part of a destination stream having substantially similar number of assets as a number of assets of a constituent part of a source stream. In another implementation, the higher level edge between the constituent parts further comprising determining the higher level edge between a constituent part of a destination stream having closest number of assets as a number of assets of a constituent part of a source stream. Alternatively, the higher-level edge between the constituent parts of the lower level edge are stored in an edge database.

A multilevel data lineage view system disclosed herein is stored in the memory and executable by the one or more processor units, the multilevel data lineage view system encoding computer-executable instructions on the memory for executing on the one or more processor units a computer process, the computer process including receiving a lower level edge including a source and a destination stream, parsing the lower level edge to determine constituent parts of the lower level edge, assigning a count of assets to each of the constituent parts of the lower level edge, and determining a higher-level edge between the constituent parts of the lower level edge based on the count of assets to each of the constituent parts of the lower level edge. In one implementation, the computer process for parsing the lower level edge to determine constituent parts of the lower level edge further comprising parsing the lower level edge using a rule engine. Alternatively, assigning a count of assets to each of the constituent parts further comprising assigning a count of assets based on a number of files below each of the constituent parts. Yet altnernatively, the higher level edge between the constituent parts further comprising determining the higher level edge between a constituent part of a destination stream having closest number of assets as a number of assets of a constituent part of a source stream.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. In a computing environment, a method performed at least in part on at least one processor, the method comprising:
   receiving a lower level edge including a source and a destination stream, the source and the destination streams organized in a hierarchy;
   parsing the lower level edge to determine constituent parts of the lower level edge;
   assigning a count of assets to each of the constituent parts of the lower level edge;
   determining a higher-level edge between the constituent parts of the lower level edge based on the count of assets to each of the constituent parts of the lower level edge; and
   determining relations between at least some objects at a first level in the hierarchy and inferring relationships between objects at a second level in the hierarchy based on the relationships between the objects at the first level in the hierarchy.

2. The method of claim 1, wherein parsing the lower level edge to determine constituent parts of the lower level edge further comprising parsing the lower level edge using a rule engine.

3. The method of claim 1, wherein assigning a count of assets to each of the constituent parts further comprising assigning a count of assets based on a number of files below each of the constituent parts.

4. The method of claim 1, wherein determining the higher-level edge between the constituent parts further comprising determining the higher-level edge based on one or more programmable rules.

5. The method of claim 1, wherein determining the higher level edge between the constituent parts further comprising determining the higher level edge between a constituent part of a destination stream having substantially similar number of assets as a number of assets of a constituent part of a source stream.

6. The method of claim 1, wherein the higher level edge between the constituent parts further comprising determining the higher level edge between a constituent part of a destination stream having closest number of assets as a number of assets of a constituent part of a source stream.

7. The method of claim 6, wherein the higher-level edge between the constituent parts of the lower level edge are stored in an edge database.

8. The method of claim 1, further comprising determining relations between at least some of these objects at a first level in the hierarchy and inferring relationships between the objects at a second level in the hierarchy based on the relationships between the objects at the first level in the hierarchy, wherein the second level is above the first level in the hierarchy.

9. The method of claim 1, wherein inferring relationships between the objects at a second level in the hierarchy comprising inferring relationships based on a count of assets below the second level in the hierarchy or total size of assets below the second level in the hierarchy.

10. The method of claim 1, wherein inferring relationships between the objects at a second level in the hierarchy comprising inferring relationships based on one or more programmable rules including rules based on regular expressions.

11. The method of claim 1, wherein inferring relationships between the objects at a second level in the hierarchy comprising inferring relationships based on a machine learning model including a machine learning model based on textual similarity, which is updated based on a user feedback received on a quality of the inferred relationships between the objects at the second level.

12. In a computing environment, a system comprising:
memory;
one or more processor units;
a multilevel data lineage view system stored in the memory and executable by the one or more processor units, the multilevel data lineage view system encoding computer-executable instructions on the memory for executing on the one or more processor units a computer process, the computer process comprising:
receiving a lower level edge including a source and a destination stream, the source and the destination streams organized in a hierarchy;
parsing the lower level edge to determine constituent parts of the lower level edge;
assigning a count of assets to each of the constituent parts of the lower level edge;
determining a higher-level edge between the constituent parts of the lower level edge based on the count of assets to each of the constituent parts of the lower level edge; and
determining relations between at least some objects at a first level in the hierarchy and inferring relationships between objects at a second level in the hierarchy based on the relationships between the objects at the first level in the hierarchy.

13. The system of claim 12, wherein the computer process for parsing the lower level edge to determine constituent parts of the lower level edge further comprising parsing the lower level edge using a rule engine.

14. The system of claim 13, wherein assigning a count of assets to each of the constituent parts further comprising assigning a count of assets based on a number of files below each of the constituent parts.

15. The system of claim 14, wherein the higher level edge between the constituent parts further comprising determining the higher level edge between a constituent part of a destination stream having closest number of assets as a number of assets of a constituent part of a source stream.

16. The system of claim 12, wherein the second level is above the first level in the hierarchy.

17. The system of claim 16, wherein inferring relationships between the objects at a second level in the hierarchy comprising inferring relationships based on a count of assets below the second level in the hierarchy or total size of assets below the second level in the hierarchy.

18. The system of claim 16, wherein inferring relationships between the objects at a second level in the hierarchy comprising inferring relationships based on one or more programmable rules including rules based on regular expressions.

19. The system of claim 16, wherein inferring relationships between the objects at a second level in the hierarchy comprising inferring relationships based on a machine learning model including a machine learning model based on textual similarity, which is updated based on a user feedback received on a quality of the inferred relationships between the objects at the second level.

\* \* \* \* \*